(12) United States Patent
Takasaki et al.

(10) Patent No.: US 8,876,368 B2
(45) Date of Patent: Nov. 4, 2014

(54) POWDER TREATING APPARATUS

(75) Inventors: Takao Takasaki, Fussa (JP); Katsumi Kawai, Yonezawa (JP); Manabu Katayose, Yonezawa (JP); Norihiro Kon, Yonezawa (JP); Takashi Fujisaki, Yonezawa (JP); Kazunori Ozawa, Tokyo (JP)

(73) Assignee: Enax, Inc., Tokyo (JP)

( * ) Notice: Subject to any disclaimer, the term of this patent is extended or adjusted under 35 U.S.C. 154(b) by 817 days.

(21) Appl. No.: 12/743,732

(22) PCT Filed: Mar. 3, 2008

(86) PCT No.: PCT/JP2008/053781
§ 371 (c)(1),
(2), (4) Date: May 19, 2010

(87) PCT Pub. No.: WO2009/110056
PCT Pub. Date: Sep. 11, 2009

(65) Prior Publication Data
US 2010/0254213 A1 Oct. 7, 2010

(51) Int. Cl.
*B01F 9/10* (2006.01)
*B01J 2/12* (2006.01)
*B01F 3/18* (2006.01)
*B01J 2/10* (2006.01)
*H01M 4/04* (2006.01)
*H01M 10/052* (2010.01)

(52) U.S. Cl.
CPC ............ *B01F 9/106* (2013.01); *H01M 4/04* (2013.01); *B01J 2/12* (2013.01); *B01F 3/18* (2013.01); *H01M 10/052* (2013.01); *B01J 2/10* (2013.01)
USPC ........... 366/231; 366/230; 366/302; 366/305

(58) Field of Classification Search
USPC ................. 366/230, 231, 302, 305
See application file for complete search history.

(56) References Cited

U.S. PATENT DOCUMENTS 26,089 A * 11/1859 Carter ........................ 209/452
28,402 A * 5/1860 Packer ........................ 366/230
(Continued)

FOREIGN PATENT DOCUMENTS

JP 2004-143071 A 5/2004
JP 2005-13501 A 1/2005
(Continued)

*Primary Examiner* — David Sorkin
*Assistant Examiner* — Abbas Rashid
(74) *Attorney, Agent, or Firm* — Birch, Stewart, Kolasch & Birch, LLP

(57) ABSTRACT

There is provided a powder treating apparatus which can uniformly and successively combine and grow powders having different specific gravities or sizes together with a simple structure. The apparatus comprises a rotating container 20 into which plural kinds of powders P having different specific gravities or sizes are supplied and which rotates in a predetermined direction, a fixed container 30 retaining the rotating container 20, primary treating means M1 which is so arranged as to face an inner periphery surface 20S of the rotating container 20 and to extend in an axial direction, generates turbulence flow including eddying flow together with a rotational motion of the rotating container 20, and stirs and mixes the powders P having different specific gravities or sizes, a communicating hole 25 for ejecting the powders P stirred and mixed by the primary treating means M1 to a predetermined treatment space around the rotating container 20, and secondary treating means M2 which applies planar compressive shear force to the powders P ejected from the communicating hole 25 with an inner periphery surface 30S of the fixed container 30 to carry out a composite treatment, and causes the powders P having undergone a composite treatment to flow back in the rotating container.

4 Claims, 8 Drawing Sheets

(56) References Cited

U.S. PATENT DOCUMENTS

| | | | | |
|---|---|---|---|---|
| 60,689 | A | * | 1/1867 | Woliston et al. ............... 165/91 |
| 735,206 | A | * | 8/1903 | Burrows ..................... 366/102 |
| 952,808 | A | * | 3/1910 | Inglish ....................... 366/305 |
| 1,042,929 | A | * | 10/1912 | Lanaux ....................... 99/524 |
| 1,609,915 | A | * | 12/1926 | Parker ......................... 62/162 |
| 2,288,137 | A | * | 6/1942 | Jones ........................... 165/78 |
| 2,969,960 | A | * | 1/1961 | Gurley, Jr. ................. 366/303 |
| 2,970,817 | A | * | 2/1961 | Gurley, Jr. ................. 366/305 |
| 3,164,375 | A | * | 1/1965 | Frenkel ........................ 366/88 |
| 3,688,991 | A | * | 9/1972 | Norwood ....................... 241/5 |
| 3,826,435 | A | * | 7/1974 | Pujol ........................... 241/171 |
| 3,861,655 | A | * | 1/1975 | Wright ........................ 366/305 |
| 3,867,104 | A | * | 2/1975 | Leybourne et al. .......... 422/137 |
| 3,952,538 | A | * | 4/1976 | Warlick ........................ 62/342 |
| 4,140,299 | A | * | 2/1979 | Henderson et al. ........ 366/181.7 |
| 4,785,999 | A | * | 11/1988 | Takijiri ......................... 241/26 |
| 4,983,046 | A | * | 1/1991 | Murata et al. ............... 366/312 |
| 5,346,147 | A | * | 9/1994 | Ishikawa et al. ............. 241/172 |
| 6,110,432 | A | * | 8/2000 | Southwick ................... 422/187 |
| 6,280,076 | B1 | * | 8/2001 | Muntener ..................... 366/149 |
| 6,508,423 | B2 | * | 1/2003 | Gloor ............................. 241/57 |
| 6,658,996 | B2 | * | 12/2003 | Eom ............................. 99/510 |
| 7,686,238 | B2 | * | 3/2010 | Naito et al. ..................... 241/1 |
| 2005/0258288 | A1 | * | 11/2005 | Dalziel et al. ............... 241/172 |
| 2007/0228201 | A1 | * | 10/2007 | Naito et al. .................. 241/107 |
| 2008/0118946 | A1 | * | 5/2008 | Fabiyi et al. ................... 435/41 |

FOREIGN PATENT DOCUMENTS

| | | | | |
|---|---|---|---|---|
| JP | | 3877450 B2 | 11/2006 | |
| WO | WO 2004112964 A1 | * | 12/2004 | ............. B02C 19/18 |

\* cited by examiner (a)

(b)

POWDER TREATING APPARATUS

TECHNICAL FIELD

The present invention relates to a powder treating apparatus which combines and grows plural kinds of powders together having different specific gravities or sizes, and more particularly, to a powder treating apparatus suitable for formation of an electrode material of, for example, lithium ion secondary batteries.

BACKGROUND ART

Patent Literature 1: Japanese Patent No. 3877450

Conventionally, there is known a powder treating apparatus (see patent literature 1) which executes a so-called composite treatment of causing a cylindrical rotor to rotate, of applying pressure and shear force to powders using an inner piece provided inwardly of the cylindrical rotor with the powders being pressed against the inner periphery surface of the cylindrical rotor, and of combining and growing another material on a surface of a specific material together.

As shown in FIG. 8, patent literature 1 discloses a powder treating apparatus 100 that has a cylindrical rotor 103 thereinside, and a casing 102 forming a treatment space 109 for treating powders 104. Compressive shear force is applied to the powders 104 from a pressing member 107 formed between a tray 106 and an inner piece 105 to thereby execute a composite treatment. Some of the combined powders 104 are ejected to the exterior of the cylindrical rotor 103 through a through-hole 120, and the ejected powders 104 are caused to flow back inside the cylindrical rotor 103 by blades 123, to thereby enable successive composite treatments.

DISCLOSURE OF INVENTION

Problem to be Solved by the Invention

The powder treating apparatus disclosed in patent literature 1 has a following problem.

That is, according to the powder treating apparatus 100, when the powders 104 all having substantially same specific gravity are supplied to the cylindrical rotor 103 and are subjected to a composite treatment, a composite material formed by combining those powders together can be acquired with a good productivity. However, when plural kinds of powders having different specific gravities or sizes are supplied and subjected to a composite treatment, it is difficult to acquire a uniform composite material.

More specifically, when plural kinds of powders having different specific gravities (e.g., a bulk specific gravity: a mass per unit volume when powders are put in a container with a constant volume in a constant state) or sizes (e.g., average grain diameter and area/weight ratio: a total of surface areas of all grains contained in powders per unit weight) are supplied in the cylindrical rotor 103, because of centrifugal separation, powders having large specific gravity or size (hereinafter, specific gravity or the like) are distributed in the vicinity of the inner periphery surface (tray 106) of the cylindrical rotor 103, subjected to application of compressive shear force by the pressing member 107, and subjected to a composite treatment. In contrast, powders having small specific gravity or the like are distributed inwardly (rotation center side) of the powders having large specific gravity or the like, it is difficult to apply compressive shear force from the pressing member 107 thereto, so that combination and growing together with the powders having large specific gravity or the like are difficult. Such a phenomenon complicates processes of uniformly arranging an aggregate of conductive materials (bulk specific gravity: 0.09 to 0.22 [g/cm$^3$], average grain diameter: 0.04 to 3.2 [μm], area/weight ratio: 20.1 to 64.2 [m$^3$/g]) around an active material (bulk specific gravity: 0.72 to 2.91 [g/cm$^3$], average grain diameter: 5.5 to 17.8 [μm], area/weight ratio: 0.14 to 1.73 [m$^3$/g]) which are proper electrode materials for increasing the capacity of a lithium ion secondary battery or the like getting attention recently, and of producing an electrode material with a high conductivity that both materials are combined and grown together. Accordingly, such difficulty interferes with increasing of the capacity of the foregoing battery.

The present invention has been made in view of the foregoing problem of the conventional technology, and it is an object of the present invention to provide a powder treating apparatus which can successively and uniformly combine and grow powders having different specific gravities or sizes together, with a simple structure.

Means for Solving the Problem

To achieve the object, a powder treating apparatus of the present invention comprises: a rotating container into which plural kinds of powders having different specific gravities or sizes are supplied and which rotates in a predetermined direction; a fixed container retaining the rotating container at a center; primary treating means which is so arranged as to face an inner periphery surface of the rotating container and to extend in an axial direction, generates turbulence flow including eddying flow together with a rotational motion of the rotating container, and stirs and mixes the powders having different specific gravities or sizes; a communicating hole provided at a bottom of the rotating container for ejecting the powders stirred and mixed by the primary treating means to a predetermined treatment space around the rotating container; and secondary treating means which is formed integrally with the rotating container, applies planar compressive shear force to the powders ejected from the communicating hole with an inner periphery surface of the fixed container to carry out a composite treatment, and causes the powders having undergone a composite treatment to flow back in the rotating container.

Note that a composite treatment means a treatment of applying compressive shear force with one powders provided around (covering) another powders having different specific gravities or sizes, and of producing a composite material by combining both powders.

According to the powder treating apparatus of the present invention configured in this fashion, it is possible to carry out a primary treatment of stirring and mixing powders having different specific gravities or sizes by utilizing a rotational motion of the rotating container without any special drive mechanism of stirring and mixing those, and then to carry out a secondary treatment of combining the powders together by applying planar compressive shear force and of causing such powders to flow back. Accordingly, a successive composite/integration treatment of uniformly combining powders having different specific gravities or sizes together can be carried out with a simple structure, resulting in reduction in size of the apparatus and cost down. Moreover, pressure under load is applied to both surfaces of the rotating container through the primary treating means and the secondary treating means, displacement and rotation fluctuation of the rotating container in the radial direction is suppressed, resulting in improvement of the quality of the composite treatment for powders.

The primary treating means may comprise a cylindrical member fixed and supported outside the rotating container and facing the inner periphery surface of the rotating container across an entire height direction of the inner periphery surface with a predetermined clearance from the inner periphery surface.

In a case in which such a configuration is employed, as the cylindrical member fixed and supported outside the rotating container and facing the inner periphery surface of the rotating container across an entire height direction of the inner periphery surface with a predetermined clearance from the inner periphery surface is used as the primary treating means for stirring and mixing powders having different specific gravities or sizes without any special drive mechanism or the like, it is possible to suppress any adhesion of the powders to the surface of the primary treating means with a simple structure, and to smoothly ensure generation of turbulence flow including eddying flow and sufficient stirring and mixing across the height direction.

The secondary treating means may comprise: a plurality of compressive shear members each protruding toward the fixed container from a bottom of an outer periphery surface of the rotating container, and having an opposing surface formed in a shape along a corresponding inner periphery surface of the fixed container with a predetermined clearance from the fixed container, the plurality of compressive shear members being arranged in a circumferential direction with a predetermined interval; and a plurality of upward flow generating members each formed between adjoining compressive shear members, and generating an upward flow of causing the powders ejected from the communicating hole to flow back in the rotating container.

In a case in which such a configuration is employed, it is possible to simultaneously arrange both the compressive shear members applying planar compressive shear force to the powders stirred and mixed by the primary treating means and ensuring a composite treatment for the powders having different specific gravities or sizes, and upward flow generating members causing the powders having undergone a composite treatment to flow back in the rotating container at the outer periphery part of the rotating container. This results in further reduction in size of the apparatus, and the secondary treating means which enables successive stirring and mixing and compressive shear treatment can be realized with a simple structure.

Each of the upward flow generating members may be an inclined groove formed between adjoining compressive shear members and inclined toward an upstream side of a rotational direction from a bottom of the compressive shear member to a top of the compressive shear member.

In a case in which such a configuration is employed, the compressive shear members and the upward flow generating members both having different functions can be simultaneously and integrally formed at the outer periphery part of the rotating container, resulting in further simplification of the apparatus and cost down. Moreover, the inclined groove inclined in a predetermined direction generates a twister-like upward spiral flow, the powders having undergone a composite treatment is raised by the upward spiral flow, and turning motion is applied to the powders, thereby further promoting stirring and mixing of the powder together with the turbulence flow generating effect by the primary treating means.

The communicating hole may pass all the way through the rotating container in a radial direction, may be provided for each inclined groove, and may be provided at a height corresponding to a bottom of the inner periphery surface of the rotating container.

In a case in which such a configuration is employed, the powders sufficiently stirred and mixed by the primary treating means so as to be a condensed material with an enhanced density are guided to the compressive shear members of the secondary treating means by centrifugal force through the communicating hole passing all the way through in the radial direction, thereby ensuring a sufficient composite treatment for the powders.

The rotating container may be further provided with a bottom-part communicating hole passing all the way through a bottom of the rotating container in a thickness direction, and a communicating path which communicates the bottom-part communicating hole and the compressive shear member is formed between the bottom of the rotating container and the fixed container.

In a case in which such a configuration is employed, the powders having a density enhanced as a condensed material and likely to remain at the bottom of the rotating container are also guided to the compressive shear member, thereby ensuring a composite treatment for the powders with a good yield.

The bottom-part communicating hole may be provided in a bottom face of the rotating container on a circumference of a substantially-same axis as the primary treating means.

In a case in which such a configuration is employed, the primary treating means can be utilized (further functions) as a guide member which guides the powders remaining at the bottom of the rotating container to the bottom-part communicating hole, thereby improving the yield of the powders subjected to a composite treatment.

In the foregoing configurations, the powders may contain an active material and a conductive material both constituting an electrode material for a lithium ion secondary battery.

In a case in which such a configuration is employed, it is possible to produce an electrode material which is appropriate for increasing of the capacity of a lithium ion secondary battery.

Effect of the Invention

According to the present invention, it is possible to realize a powder treating apparatus which sufficiently stirs and mixes powders having different specific gravities or sizes, and which enables successive composite treatments with a simple structure.

EXPLANATION OF REFERENCE NUMERALS

Figure 1:
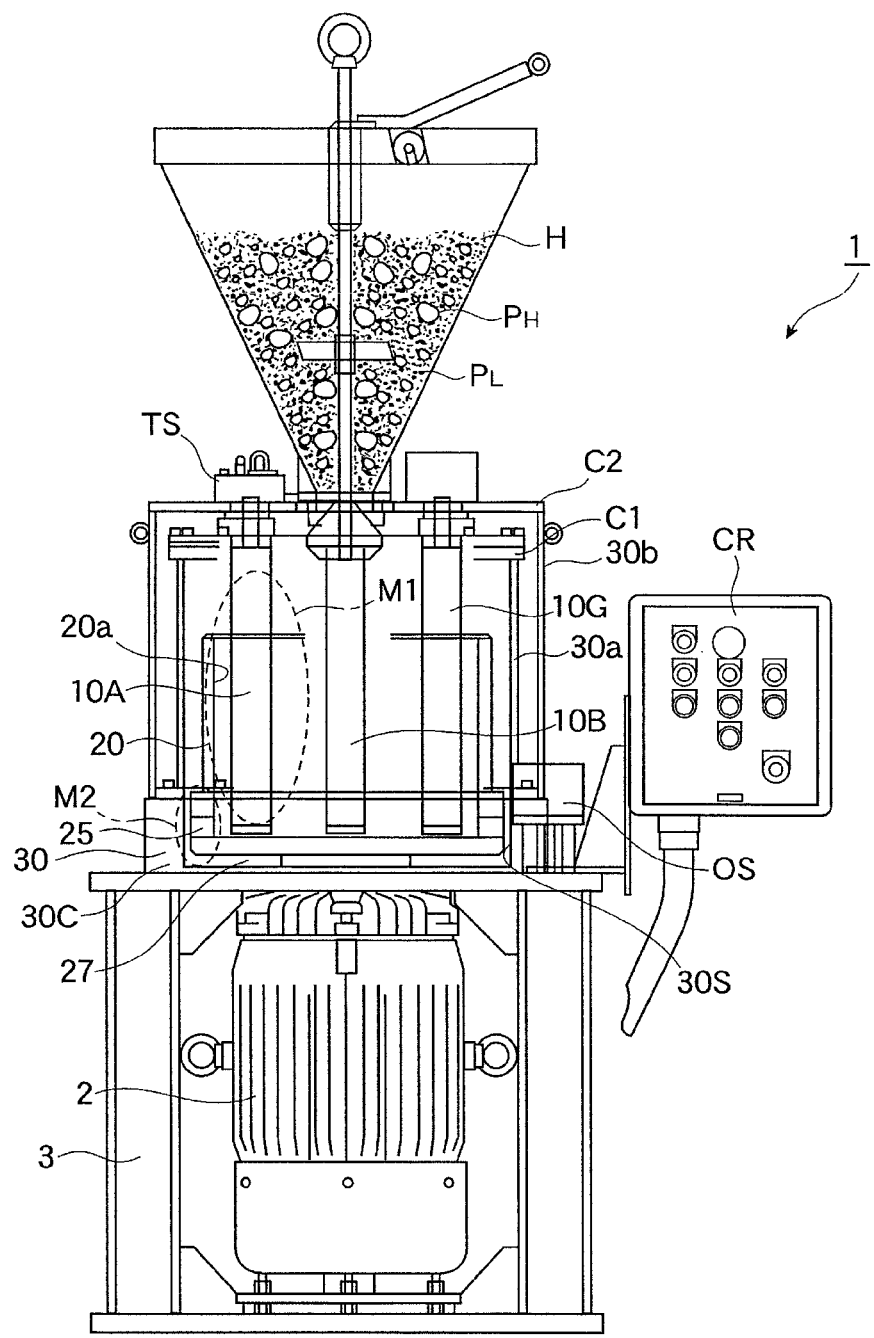
FIG. 1 is an exemplary diagram showing a general configuration of a powder treating apparatus of the present invention.

1 Powder treating apparatus
2 Motor
3 Frame mount
10A, 10B, 10C Stir rod
11 Rod part
12 Flange part
20 Rotating container
20a Inner periphery surface
21 Compressive shear member
21S Opposing surface
23 Inclined groove
25 Communicating hole
26 Bottom-part communicating hole
27 Bottom-part communicating path
30 Fixed container
30S Inner periphery surface
30a Inner jacket
30b Outer jacket
30c Bottom part
33 Ejection opening
35 Ejection valve
A Lithium ion secondary battery
C1 Inner lid
$C1_O$ Powder supply opening
C2 Outer lid
EMp Positive electrode material
EMn Negative electrode material
H Hopper
M1 Primary treating means
M2 Secondary treating means
N Narrowed part
P, $P_H$, $P_L$ Powder
$P_C$ Composite material

BEST MODE FOR CARRYING OUT THE INVENTION

An explanation will be given of an embodiment of the present invention with reference to the accompanying drawings. First, a general configuration of a powder treating apparatus of the embodiment will be explained with reference to FIG. 1.

As shown in FIG. 1, a powder treating apparatus 1 of the embodiment is fixed on a frame mount 3 where a motor 2 which is a drive source is provided thereinside, and has a hollow-cylindrical fixed container 30 having a substantially U-shaped cross section. A hollow-cylindrical rotating container 20 which is rotated and driven by the motor 2 is provided at the center of the fixed container 30, and plural kinds of powders $P_H$, $P_L$ having different specific gravities (e.g., bulk specific gravity) or sizes (e.g., average grain diameter and area/weight ratio) are supplied in the rotating container 20. The side face of the fixed container 30 employs a double-casing structure in which a hollow-cylindrical inner jacket 30a and a hollow-cylindrical outer jacket 30b having a larger external diameter than the inner jacket 30a are coaxially arranged on a bottom part 30c with a substantially U-shaped cross section. A top part of the inner jacket 30a is sealed and closed by an inner lid C1, and a top part of the outer jacket 30b is sealed and closed by an outer lid C2. A hopper H in a reversed-conical shape for supplying the plural kinds of powders $P_H$, $P_L$ having different specific gravities or sizes into the rotating container 20 is provided on the outer lid C2 and at the center thereof. The inner lid C1 is provided with three cylindrical stir rods 10A, 10B, and 10C configuring primary treating means, and each stir rod 10A, 10B, and 10C is suspended on the inner lid C1 in such a manner as to extend in the lengthwise direction (direction of rotational axis) in the vicinity of an inner periphery surface 20a of the rotating container 20. Secondary treating means M2 to be discussed in detail later is provided at the lower part of the rotating container 20 in such a manner as to protrude from a lower outer periphery surface of the rotating container 20 toward an inner periphery surface 30S of the bottom part 30c of the fixed container 30. The plural kinds of powders $P_H$, $P_L$ having different specific gravities or sizes supplied in the rotating container 20 from the hopper H are sufficiently stirred and mixed by the primary treating means M1, guided to the secondary treating means M2 through a communicating hole 25 provided at a lower part of the rotating container 20, subjected to application of planar compressive shear force and a composite treatment by the secondary treating means M2, caused to flow back in the rotating container 20 again. Through such steps, a composite material of the powders $P_H$, $P_L$ having different specific gravities or sizes is thus formed. In the embodiment, nitrogen gas is purged in the fixed container 30, so that the risk of ignition at the time of a composite treatment is suppressed beforehand. Note that a symbol TS is a temperature sensor which detects a temperature in the fixed container 30, and a symbol OS is an oxygen concentration sensor which detects an oxygen concentration in the fixed container 30. Moreover, a symbol CR is an operator control panel for operating and controlling an operation of each unit.

Next, an explanation will be given of detailed configurations of major parts of the powder treating apparatus of the embodiment.

<Stir Rod>

Figure 2:
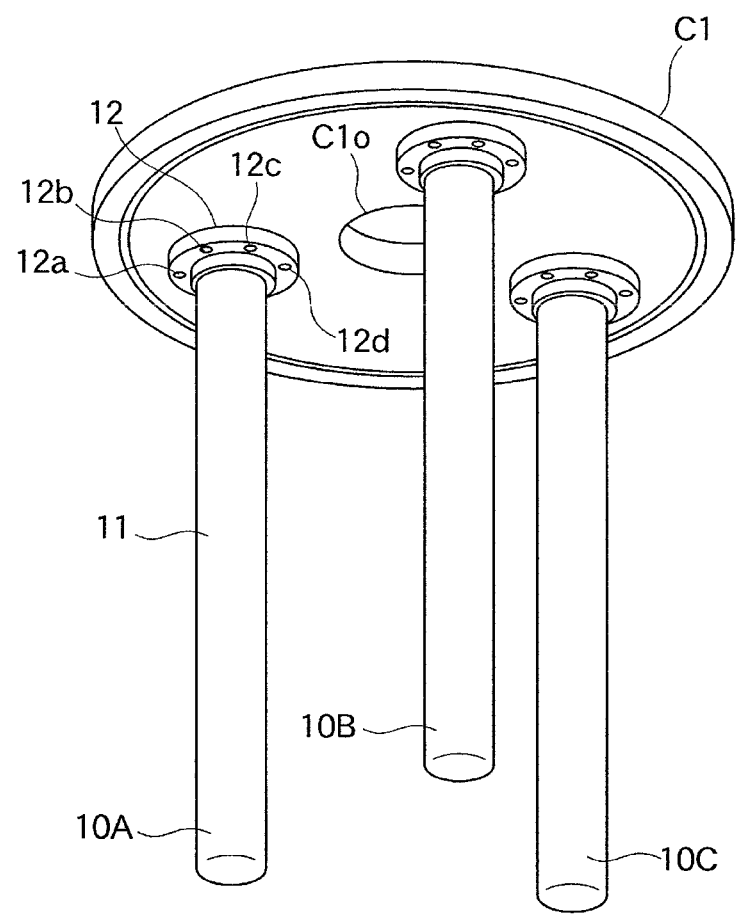
FIG. 2 is an exemplary diagram showing primary treating means of the present invention.

The stir rod 10 configuring the primary treating means M1 of the embodiment is, as shown in FIG. 2, a cylindrical member fixed and provided on the disc inner lid C1 having a powder supply opening $C1_O$ at the center thereof. In the embodiment, three stir rods 10A, 10B, and 10C are attached to the inner lid C1 in a circumferential direction at an equal interval. When the inner lid C1 which is a support member is attached to the inner jacket 30a of the fixed container 30, the stir rods 10A, 10B, and 10C are arranged so as to face the inner periphery surface 20a of the rotating container 20 with a predetermined clearance.

More specifically, each stir rod 10A, 10B, and 10C has a metallic (e.g., stainless-made) cylindrical rod part 11 and a disc flange part 12 formed integrally with a top end of the rod part 11. Each flange part 12 is provided with plural attachment holes (e.g., six attachment holes 12a to 12f) in the circumferential direction at an equal interval. The inner lid C1 also has corresponding attachment holes in a concentric fashion, and as those attachment holes are fastened together by means of bolts and nuts, the stir rods 10A, 10B, and 10C and the inner lid C1 are joined together. Note that the stir rod 10A, 10B, and 10C in the embodiment is an eccentric rod having the center of the cylindrical rod part 11 slightly offset from the center of the disc flange part 12, so that when the stir rod 10A, 10B, and 10C is attached to the inner lid C1, if the correspondence relation between the attachment hole 12a to 12f of the flange part 12 and the attachment hole of the inner lid C1 is changed in the circumferential direction, a clearance between the rod part 11 of the stir rod 10A, 10B, and 10C and the inner periphery surface 20a of the rotating container 20 can be easily changed and adjusted (in the embodiment, from 3 to 8 mm).

The primary treating means M1 in the embodiment is configured as the stir rod 10 fixed and attached to the inner lid C1 (in the embodiment, suspended to the inner lid C1) which is a support member provided externally of the rotating container 20 is arranged so as to face the inner periphery surface 20a of the rotating container 20 with a predetermined clearance and so as to extend in the axial direction across the whole area of the height direction of the inner periphery surface 20a (in the embodiment, arranged so as to face substantially whole area of the inner periphery surface 20a beyond the height of the rotating container 20). In the embodiment, a clearance between a leading end of the stir rod 10 and a bottom face of the rotating container 20 is set to be about 3 mm. As the stir rod 10 is arranged in such a manner as to face the inner periphery surface 20a of the rotating container 20 and as to extend in the axial direction in this fashion, because of a turbulence (eddying flow) generating effect to be discussed later, it becomes possible to stir and mix the powders $P_H$, $P_L$ having different specific gravities or sizes using the rotational motion of the rotating container 20 without an additional mixing device or a mixing treatment beforehand, and without a special drive source or a drive mechanism for driving the stir rod 10, thereby reducing a size of the apparatus and a cost thereof.

Moreover, as the stir rod 10 is fixed and attached to the inner lid C1 provided externally of the rotating container 20 and is arranged so as to face the inner periphery surface 20a of the rotating container 20 across the entire area thereof in the height direction, for example, in comparison with a configuration that the stir rod 10 is supported by a support member extending inside the rotating container 20, a sufficient room is secured around the stir rod 10 without disturbing the turbulence generating effect, thereby smoothly generating turbulence for stirring and mixing.

Note that the number of stir rods 10 can be set arbitrary, but from the standpoint of generating uniform turbulence (eddying flow) and of sufficiently stirring and mixing the powders $P_H$, $P_L$ having different specific gravities or sizes, it is preferable that the plurality of stir rods 10A, 10B, 10C, and the like should be arranged at an equal interval in a circumferential direction. Moreover, it is preferable that the stir rod 10 should have a length such that at least rod part 11 thereof faces the inner periphery surface 20a of the rotating container 20 across the whole height direction from the standpoint of applying a uniform stirring effect to the plural kinds of powders $P_H$, $P_L$ having different specific gravities or sizes and supplied in the rotating container 20 in the axial direction (height direction). Furthermore, it is preferable that the stir rod 10 (rod part 11) should have a shape such that a horizontal cross section thereof is in a curved shape (convex shape), and more preferably, in a true-circular shape (circular cylindrical shape) from the standpoint of avoiding any adhesion of the powders $P_H$, $P_L$ thereto which contact the surface of the rod part 11 (i.e., powders are likely to detach therefrom) and of generating eddying flow for stirring and mixing. Likewise, in the embodiment, a leading end (bottom part) of the stir rod 10 has a bottom edge part chamfered from the standpoint of avoiding any adhesion of the powders $P_H$, $P_L$ thereto due to contact which remain at the bottom of the rotating container 20.

In the embodiment, as a preferred example of the primary treating means M1, a structure that the cylindrical members 10 are suspended on the inner lid C1 so as to face the inner periphery surface 20S of the rotating container 20 is employed. However, the primary treating means M1 of the present invention is not limited to this structure, and for example, a stirring/mixing member having a shape enabling generating of turbulence flow including eddying flow together with a rotational motion may be fixed and supported outside the rotating container 20 without disturbing such turbulence flow.

<Rotating Container>

Figure 3:
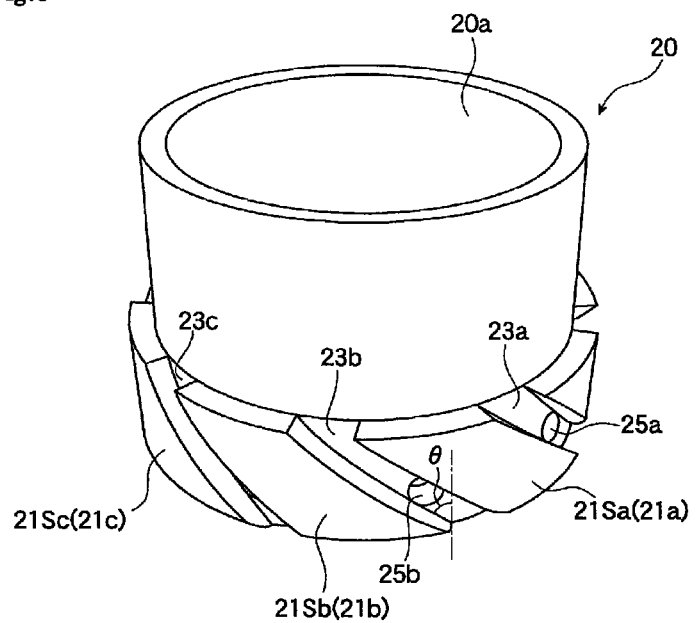
FIG. 3 is an exemplary diagram showing a configuration of an outer periphery part of a rotating container of the present invention.

As shown in FIG. 3, the external part of the rotating container 20 has plural compressive shear members 21a, 21b, 21c, and the like protruding toward the fixed container 30 and formed in the circumferential direction at the bottom of the outer periphery surface. The compressive shear members 21a, 21b, 21c, and the like respectively have opposing surfaces 21Sa, 21Sb, 21Sc, and the like formed along the shape of the inner periphery surface 30S of the fixed container 30 (see FIG. 1) facing thereto. The opposing surfaces 21Sa, 21Sb, 21Sc, and the like are arranged so as to face the inner periphery surface 30S of the fixed container 30 with a predetermined clearance (in the embodiment, about 1 mm), thereby forming a treating space for applying compressive shear force (composite treatment) to the powders P. Each compressive shear member 21a, 21b, 21c, or the like is formed in a shape with an oblique rectangular cross section having two upper and lower sides of the opposing surface 21Sa, 21Sb, 21Sc, or the like horizontal to each other (in the embodiment, the width in the circumferential direction is about 34 mm), and more specifically, two sides opposite to each other in the circumferential direction are inclined toward the upstream side of the rotational direction of the rotating container 20 from bottom to top along the rotational direction (sides inclined from the bottom part of the downstream side to the upper part of the upstream side).

As the compressive shear members 21a, 21b, 21c and the like are formed in the circumferential direction with a predetermined interval (in the embodiment, about 30 mm), inclined grooves 23a, 23b, 23c, and the like serving as upward-flow generating members are each formed between adjoining compressive shear members. More specifically, the inclined grooves 23a, 23b, 23c, and the like are each formed as a groove inclined (in the embodiment, an inclination angle θ relative to the vertical direction is about 60 degree, and depth is about 20 mm) toward the upstream side of the rotational direction from bottom to top along the inclined side of the compressive shear member 21a, 21b, 21c, or the like having an oblique rectangular cross section. Note that the inclination angle θ can be selected arbitrary in accordance with a rotational speed of the rotating container 20 so as to generate upward spiral flow.

If the height of the compressive shear member 21a, 21b, 21c, or the like is too high, it brings about generation of heat by successive composite treatment, and from the standpoint of ensuring good circulation to a composite treatment (compressive shear treatment), it is preferable that the compressive shear member 21a, 21b, 21c, or the like should have a height (in the embodiment, about 100 mm) lower than at least the height (in the embodiment, about 250 mm) of the rotating container 20, and more preferably, ⅓ to ⅔ of the height of the rotating container 20.

As the grooves 23 inclined in a predetermined direction are formed in the outer periphery part of the rotating container 20 in this fashion, it becomes possible to generate upward spiral flow like a twister raising the powders P while circulating the powders P in a direction opposite to the rotational direction of the rotating container 20. Moreover, as the foregoing grooves 23 are formed between respective adjoining compressive shear members 21, it becomes possible to simultaneously form the compressive shear member 21 and the upward-flow generating member 23 both having different functions on the outer periphery part of the rotating container 20, resulting in remarkable size reduction and cost down of the apparatus.

Each inclined groove 23a, 23b, 23c or the like is provided with a communicating hole 25a, 25b, 25c or the like formed at a position corresponding to the bottom of the inner periphery surface of the rotating container 20 (lowermost part of the stir rod 10), passing all the way through the rotating container 20 in the radial direction, and communicating the interior of the rotating container 20 with the exterior thereof.

Figure 4:
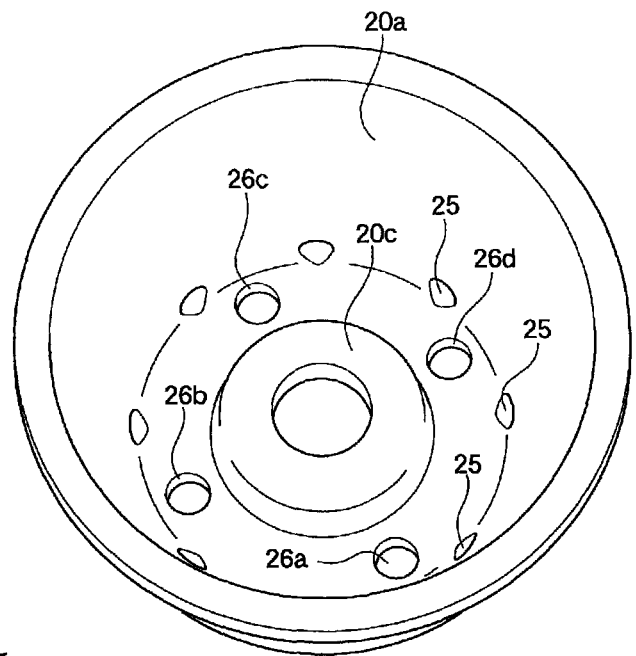
FIG. 4 is an exemplary diagram showing a configuration of an inner periphery part of the rotating container of the present invention.

Conversely, as is exemplary shown in FIG. 4, the interior of the rotating container 20 is formed in a shape having a substantially U-shaped vertical cross section, and the bottom surface of the rotating container 20 has plural bottom-part communicating holes 26 (in the embodiment, four bottom-part communicating holes 26a, 26b, 26c, and 26d) passing all the way through the bottom part of the rotating container 20 in the thickness direction, and formed on the circumference of the same axis as each stir rod 10A, 10B, or 10C (the distance from the rotation center of the rotating container 20 is substantially same as the distance to each stir rod 10A, 10B, or 10C). In the embodiment, the rotating container 20 is coupled to the motor 2 through a non-illustrated seal member and bearing at a coupling member 20c formed at the substantial center of the rotating container 20, and a predetermined clearance (in the embodiment, about 3 mm) is provided between the external bottom surface of the rotating container 20 and the internal bottom surface of the fixed container 30 so that both surface do not contact with each other. Such a clearance forms a bottom-part communicating path 27 (see FIG. 1) communicating each bottom-part communicating hole 26a, 26b, 26c, and 26d with each compressive shear member 21a, 21b, 21c, and the like.

The compressive shear members 21 and the upward-flow generating members 23 configure the secondary treating means M2 of the embodiment. The powders P having undergone primary treatment in the rotating container 20 are guided to the compressive shear members 21 through each communicating hole 25, 26, subjected to a composite treatment, and caused to flow back to the interior of the rotating container 20 again by upward spiral flow generated by the inclined grooves 23.

<Fixed Container>

Figure 5:
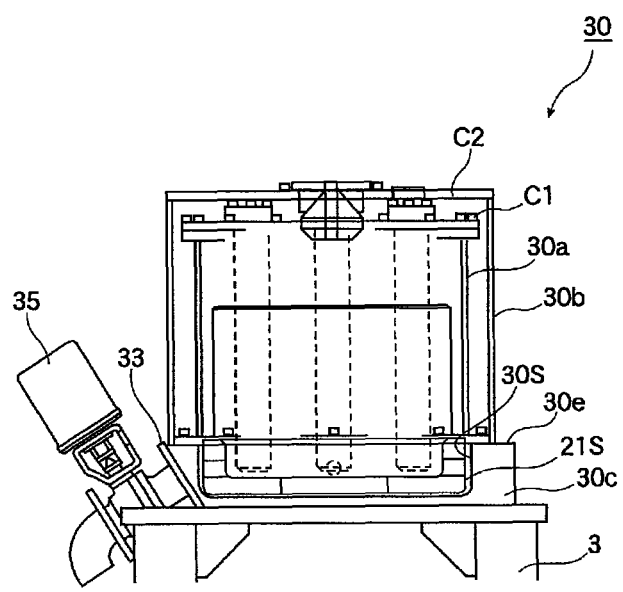
FIG. 5 is an exemplary diagram showing a configuration of a fixed container of the present invention.

The fixed container 30 retains the rotating container 20 at the center thereof in a rotatable manner so as to form a predetermined treating space for the powders P around the rotating container 20. As shown in FIG. 5, the fixed container 30 has a bottom part 30c fixed and provided on the frame mount 3 and formed in a shape with a substantially U-shaped cross section, and hollow-cylindrical inner jacket 30a and outer jacket 30b attached in, through a flange, plural attachment holes provided in the circumferential direction in an upper end surface 30e of the bottom part 30c.

The bottom part 30c of the fixed container 30 has substantially same height as that of the compressive shear member 21a, 21b, 21c, or the like of the rotating container 20, and has the inner periphery surface 30S facing the opposing surfaces 21Sa, 21Sb, 21Sc, or the like. A part of the inner periphery surface 30S facing the compressive shear members 21a, 21b, 21c and the like has an ejection opening 33 passing all the way through the bottom part 30c of the fixed container 30 in the radial direction so as to eject the powders P having undergone a composite treatment. The ejection opening 33 is openable/closable by an ejection valve 35 provided at the exterior of the fixed container 30.

The upper part of the bottom part 30c of the fixed container 30 employs a double-casing structure by the inner jacket 30a and the outer jacket 30b. The upper part of the inner jacket 30a is closed and sealed by the inner lid C1, the upper part of the outer jacket 30b is closed and sealed by the outer lid C2, and a space formed between the inner jacket 30a and the outer jacket 30b and a space formed between the inner lid C1 and the outer lid C2 are subjected to air-cooling or non-illustrated coolant is supplied in such spaces, thereby suppressing any excessive heat generation at the time of a composite treatment.

Figure 6:
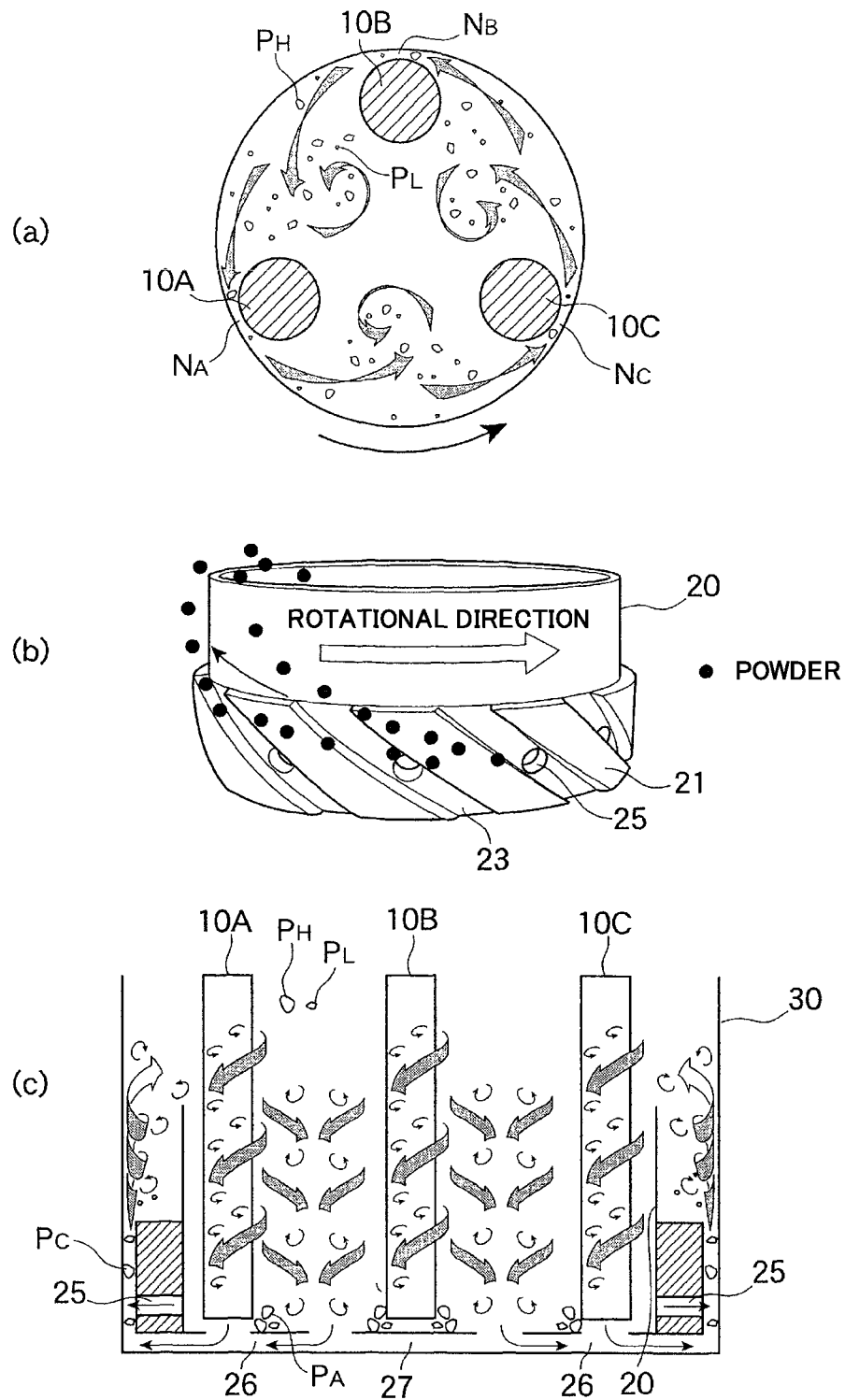
FIG. 6 is an exemplary diagram for explaining an effect of the primary treating means and that of secondary treating means of the present invention.
Figure 7:
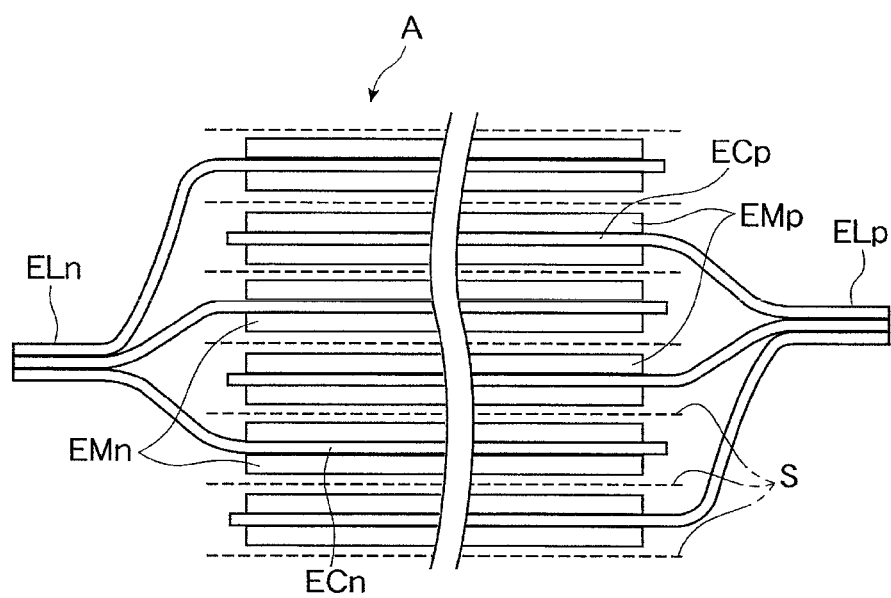
FIG. 7 is an exemplary diagram showing a configuration of a lithium ion secondary battery manufactured using an electrode material produced by the powder treating apparatus of the present invention.

Next, an explanation will be given of an operation of the powder treating apparatus 1 of the embodiment and an effect thereof with reference to FIGS. 6 and 7. FIG. 6(a) is an exemplary diagram showing a flow of the powders by the primary treating means M1, FIG. 6(b) is an exemplary diagram showing a flow of the powders by the secondary treating means M2, and FIG. 6(c) is an exemplary diagram showing a flow of the powders by the primary treating means M1 and the secondary treating means M2.

Regarding powders $P_H$, $P_L$ having different specific gravities or the like and supplied in the rotating container 20 from the hopper H, in general, the powders $P_H$ having a larger specific gravity or the like are distributed in the vicinity of the inner periphery surface 20a of the rotating container 20 because of a centrifugal separation effect, and the powders $P_L$ having a smaller specific gravity or the like are distributed around the rotational center in comparison with the larger powder $P_H$ and are likely to flow in the circumferential direction along the rotational direction of the rotating container 20. However, it is found that the flows of the powders $P_H$, $P_L$ in the circumferential direction generate turbulence flow including eddying flow around the stir rods 10A, 10B, and 10C as the predetermined stir rods 10A, 10B, and 10C fixed and supported outside the rotating container 20 are provided so as to face the inner periphery surface 20a of the rotating container 20 with a predetermined clearance (in the embodiment, 3 to 8 mm). Moreover, it becomes clear from the study of the inventors of the present invention that by repeating a process of applying planar compressive shear force by the secondary treating means M2 after the powders are mixed and stirred by the primary treating means M1 having a turbulence flow generating effect (an effect of generating turbulence flow including eddying flow) together with the rotational motion of the rotating container 20, the powders $P_H$, $P_L$ having different specific gravities or sizes can be treated well with a simple structure and in a short time.

Such an effect will now be explained briefly. As is exemplary shown in FIG. 6(a), because of the turbulence flow generating effect of the stir rods 10A, 10B, and 10C, the powders $P_L$ having a smaller specific gravity or the like are trapped in eddying flow, stirred and mixed with the powders $P_H$ having a larger specific gravity or the like, and guided to narrowed parts $N_A$, $N_B$, and $N_C$ formed between the stir rods 10A, 10B, and 10C and the inner periphery surface 20a. At this time, the powders $P_H$, $P_L$ receive condensation force, thereby forming powders (hereinafter, condensed material $P_A$ in some cases) that the powders $P_H$ having a larger specific gravity or the like and the powders $P_L$ having a smaller specific gravity or the like are mixed and combined loosely. As is exemplary shown in FIG. 6(c), the condensed material $P_A$ falls down through the same process while rotating spirally in accordance with effects of centrifugal force and gravity. Accordingly, the condensed material $P_A$ which is present below (in the vicinity of the bottom face) the stir rod 10 is likely to pass through the narrowed part N repeatedly many times, and it is expected that the condensed material of the powders $P_H$, $P_L$ having different specific gravities or the like becomes dense. The condensed material $P_A$ in this condition is ejected to the exterior of the rotating container 20 from the interior thereof by centrifugal force through the communicating hole 25 provided at a position (height) corresponding to the lowermost end of the stir rod 10, and guided to the compressive shear member 21. Note that the condensed material $P_A$ not ejected through the communicating hole 25 and remaining on the bottom surface of the rotating container 20 is guided to the bottom-part communicating hole 26 by the stir rod 10 arranged on the orbit of rotation of the rotating container 20 above the bottom-part communicating hole 26, and is likely guided to the compressive shear member 21 through the bottom-part communicating path 27 by centrifugal force.

Next, as is exemplary shown in FIG. 6(b), the condensed material $P_A$ guided to the compressive shear member 21 configuring the secondary treating means M2 moves through an opposing space formed between the opposing surfaces 21Sa, 21Sb, 21Sc, and the like of the plural compressive shear members 21a, 21b, 21c, and the like and the inner periphery surface 30S of the fixed container 30 across the adjoining compressive shear members 21 in a direction opposite to the rotational direction of the rotating container 20. At this time, successive (planar) compressive shear force is applied by the opposing surface 21S and the inner periphery surface 30S, so that powders (hereinafter, composite material $P_C$ in some cases) that the powders $P_H$, $P_L$ having different specific gravities or sizes are combined together is formed.

As planar and successive compressive shear force is applied in this fashion by the compressive shear member 21 having the plural opposing surface 21S integrally formed with the rotating container 20, for example, in comparison with a conventional structure that a compressive shear member (e.g., inner piece 105 in FIG. 8) linearly facing the inner periphery surface 20a of the rotating container 20 is used, the powders $P_H$, $P_L$ having different specific gravities or sizes can be surely subjected to a composite treatment. Moreover, because planar pressure (compressive load pressure) is applied to both surfaces (inner periphery surface and outer periphery surface) of the rotating container 20 through the primary treating means M1 and the secondary treating means M2, in comparison with a conventional structure that planar pressure is applied to only the inner periphery surface of the rotating container 20, it is possible to suppress any displacement or rotation fluctuation of the rotating container 20 in the radial direction, so that a composite treatment can be carried out while maintaining uniform compressive shear force, thereby improving the quality of the composite material $P_C$.

Some of the powders P having undergone a composite treatment are trapped in upward spiral flow generated by the inclined grooves 23a, 23b, 23c and the like formed integrally between adjoining compressive shear members 21a, 21b, 21c, and the like and configuring the secondary treating means M2, rotated, raised, and caused to flow back in the rotating container 20 when moving between adjoining compressive shear members 21.

As explained above, according to the powder treating apparatus 1 of the embodiment, the powders $P_H$, $P_L$ having different specific gravities or sizes become a condensed material $P_A$ having a density enhanced as the powders are sufficiently stirred and mixed well by the primary treating means M1, and such a condensed material becomes a composite material $P_C$ produced by application of planar compressive shear force from the secondary treating means M2. The composite material $P_C$ is caused to flow back in the rotating container 20 by upward spiral flow, and is stirred and mixed with new powders $P_H$, $P_L$.

At this time, because the composite material $P_C$ is trapped in the twister-like upward spiral flow and caused to flow back, turning motion is also applied to the composite material $P_C$ itself, and such turning motion and the turbulence flow (eddying flow) generating effect of the primary treating means M1 work together to promote further stirring and mixing with new powders $P_H$, $P_L$. That is, as is exemplary shown in FIG. 6(c), the composite material $P_C$ caused to flow back by the upward spiral flow generated by the secondary treating means M2 produces a new condensed material $P_A$ having a condensed density enhanced because of promotion of stirring and mixing with new powders $P_H$, $P_L$ and a new composite material $P_C$ further grown well based on the condensed material $P_A$ is thus produced. After such process is repeated for a predetermined time, as the ejection valve 35 is opened, the composite material $P_C$ having undergone a composite treatment by the compressive shear members 21 is ejected from the ejection opening 33 by centrifugal force.

As explained above, according to the powder treating apparatus 1 of the embodiment, the powders $P_H$, $P_L$ having different specific gravities or sizes are sufficiently stirred and mixed together, and combined and grown together by repeating the foregoing process, thereby producing the composite material $P_C$ further grown well in a condition that the condensed density is enhanced.

When a composite treatment was carried out using active materials (positive electrode materials: $LiCoO_2$, $LiMn_2O_4$, $LiMnO_4$, $LiNiO_2$, LNMCO, bulk specific gravity: 0.72 to 2.91 [$g/cm^3$], negative electrode material: MCMB, bulk specific gravity: 1.11 [$g/cm^3$]) as the powders $P_H$ having a larger bulk specific gravity, and conductive materials (positive electrode materials: KS-6, SUPER P (registered trademark) made by TIMCAL corporation, bulk specific gravity: 0.22 [$g/cm^3$], negative electrode material: SUPER P, bulk specific gravity: 0.09 [$g/cm^3$]) as the powders $P_L$ having a smaller bulk specific gravity by the powder treating apparatus 1 of the embodiment, an electrode material EM having the conductive materials combined together around the active materials and grown well was acquired as the final composite material $P_C$. As is exemplary shown in FIG. 8, a sheet-like lithium ion secondary battery A was produced using the electrode material EM. More specifically, a positive electrode material EMp was applied on predetermined both surface area of a positive electrode collector ECp formed of aluminum to form a sheet-like positive electrode ELp, and a negative electrode material EMn was applied on predetermined both surface area of a negative electrode collector ECn formed of copper to form a sheet-like negative electrode ELn. The sheet-like positive electrodes ELp and the sheet-like negative electrodes ELn were alternately stacked together via a separator S to form a sheet-like internal electrode pair, and the internal electrode pair and an electrolysis solution were encapsulated by a non-illustrated laminate film, thereby producing a sheet-like lithium ion secondary battery A. In comparison with a case in which electrode materials EM' produced by, for example, the powder treating apparatus 100 shown in FIG. 8 were used, it was confirmed that the battery capacity was remarkably increased.

Figure 8:
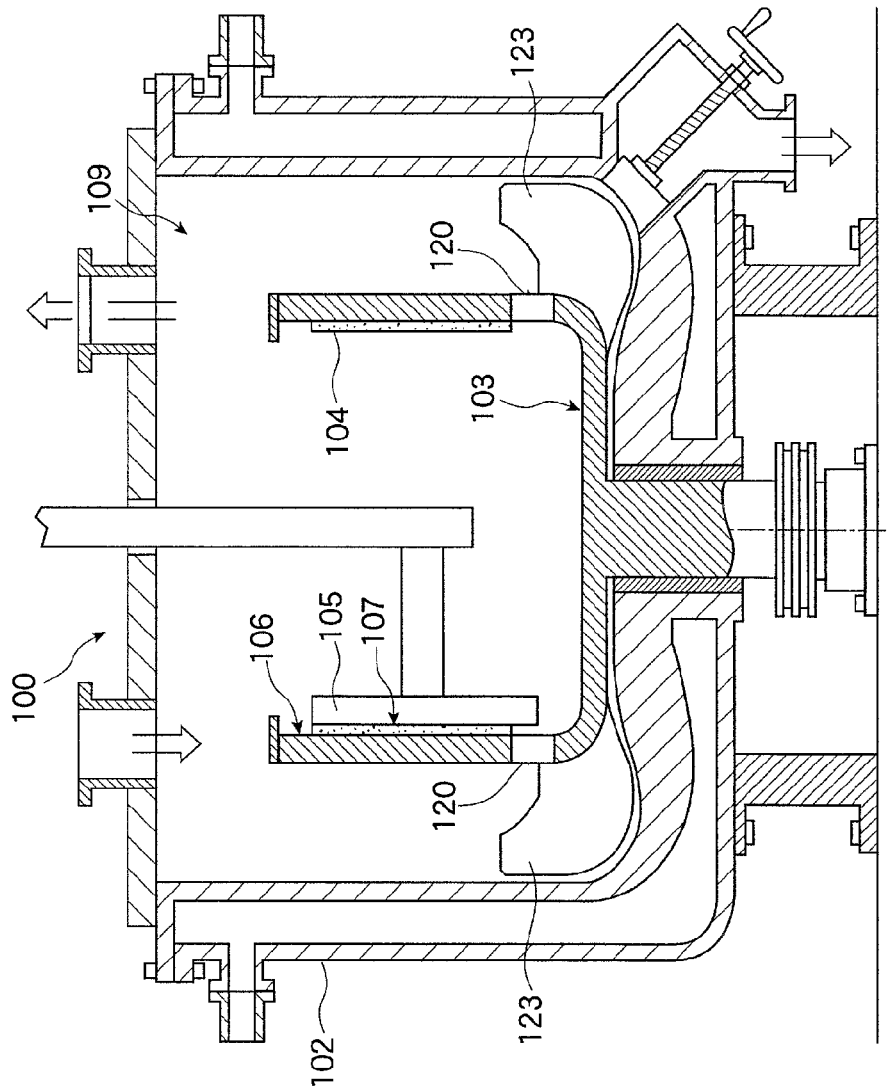
FIG. 8 is an exemplary diagram showing a general configuration of a conventional powder treating apparatus.
Figure 9:
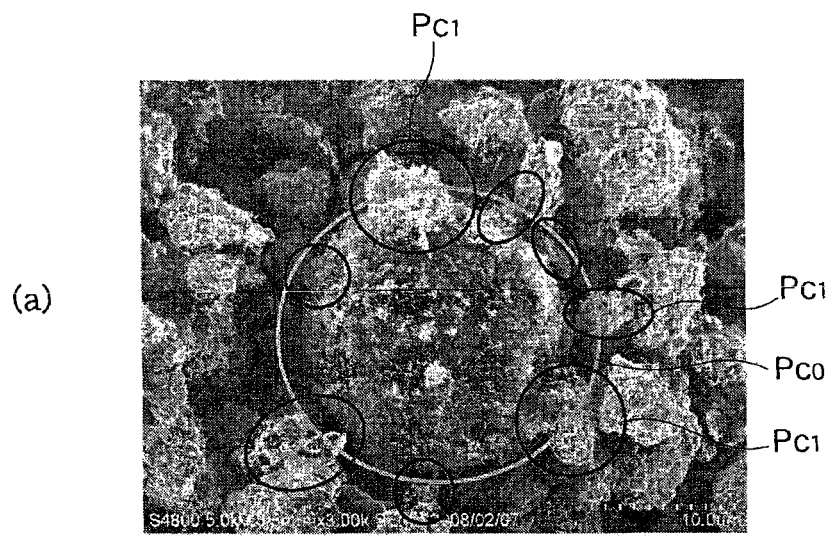
FIG. 9 is a diagram showing an electrode material produced using the powder treating apparatus of the present invention and an electrode material produced using a conventional powder treating apparatus.
Figure 9:
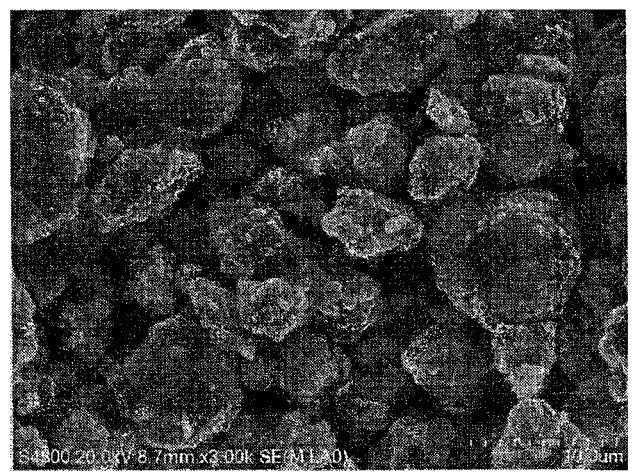

More specifically, electrode materials EM, EM' were formed using the powder treating apparatus 1 of the present invention and the powder treating apparatus 100 shown in FIG. 8 with the same operating conditions, such as the rotational speed (in this example, 600 rpm) and the operating time (in the example, 30 minutes). FIG. 9 shows the electrode materials EM, EM' acquired eventually and observed through an electron microscope. FIG. 9(a) shows a positive electrode material EMp produced by the powder treating apparatus 1 of the present invention, and FIG. 9(b) shows a positive electrode material EMp' produced by the conventional powder treating apparatus 100. Note that LNMCO/KS-6/S-P were used as the active materials and conductive materials configuring the electrode materials EM, EM' at a ratio by weight of 94/2/4.

As is clear from FIG. 9(a), it was observed that the positive electrode material EMp produced by the powder treating apparatus 1 of the present invention had a composite material $P_{C0}$ grown in a substantially spherical shape with the conductive material uniformly covering the periphery of the active material, and a condensed material $P_{C1}$ of the conductive material combined integrally and extending like a tentacle from the conductive material layer on the surface of the substantially-spherical composite material $P_{C0}$. It is thought that because the active material and the conductive material were sufficiently stirred and mixed and planar compressive shear force was applied in a condition once condensed according to the powder treating apparatus 1 of the present invention, the active material was covered by the condensed conductive material and combined and grown together without breaking a bonding of the active material with the conductive material. In contrast, as shown in FIG. 9(b), according to the electrode material EMp' produced by the conventional powder treating apparatus 100, no such composite material $P_{C1}$ or condensed material $P_{C1}$ combined thereto together was observed. In a case in which the powder treating apparatus 1 of the present invention was used, like the positive electrode material EMp, it was observed that a negative electrode material EMn had a composite material $P_{C0}$ grown in a spherical shape and a tentacle-like condensed material $P_{C1}$.

In general, it is known that the battery capacity increases if active materials each covered by the conductive material are bonded together and formed in a network-like manner (e.g., Kazuhiro Tachibana et al., Electrochemistry, 71, No. 12 (2003)).

Accordingly, the composite material $P_{C0}$ grown well in a spherical shape and the tentacle-like condensed material $P_{C1}$ of the conductive material both forming the electrode material EM not only improves the conductivity by forming a composite material that the active material is covered with the conductive material uniformly, but also facilitates bonding of adjoining composite materials in a network-like manner to increase the contact area with the collector EC, resulting in increasing of the battery capacity.

Conversely, in the case of the electrode material EMp' formed by the conventional powder treating apparatus 100, no such spherical composite material $P_{C0}$ and tentacle-like conductive material $P_{C1}$ was observed, and there was a tendency that the longer the time of a composite treatment became, the lower the battery capacity became. It is thought that this is because linear compressive shear force was applied to the powders P for a long time with the distribution of the active material and that of the conductive material being nonuniform, bonding of the active material with the conductive material were cut and separated with time, so that the conductivity was decreased.

As explained above, according to the powder treating apparatus 1 of the present invention, it is possible to sufficiently stir and mix the powders $P_H$, $P_L$ having different specific gravities or sizes by the primary treating means M1, which generates turbulence flow including eddying flow in the rotating container 20, together with the rotational motion of the rotating container 20 without a special drive mechanism or the like for stirring and mixing the powders $P_H$, $P_L$ having different specific gravities or sizes, to form a composite material $P_C$ by applying planar compressive shear force to a condensed material $P_A$ having a condensed density enhanced by the secondary treating means M2, and to form a composite materials $P_C$ covered by the conductive material, grown well in a spherical shape, and mutually connected together in a network-like manner by causing the composite materials $P_C$ to flow back to carry out a circulation treatment, thereby enabling formation of electrode materials EMp, EMn having a conductivity very high as a final composite material $P_C$.

Note that in the foregoing embodiment, as a suitable application example, an electrode material for a lithium ion secondary battery is formed, but the application of the present invention is not limited to such lithium ion secondary battery. The present invention can be applied to formation of an electrode material for electrical energy accumulating devices having the same structure, such as a battery, an electrical double layer capacitor, and a super capacitor.

The invention claimed is:

1. A powder treating apparatus comprising:
a rotating container into which plural kinds of powders having different specific gravities or sizes are supplied and which rotates in a predetermined direction;
a fixed container retaining the rotating container at a center;
primary treating means which is so arranged as to face an inner periphery surface of the rotating container and to extend in an axial direction, generates turbulence flow including eddying flow together with a rotational motion of the rotating container, and stirs and mixes the powders having different specific gravities or sizes;
a communicating hole provided at a side face of a lower part of the rotating container for ejecting the powders stirred and mixed by the primary treating means to a predetermined treatment space around the rotating container; and
secondary treating means which is formed integrally with the rotating container, applies planar compressive shear force to the powders ejected from the communicating hole with an inner periphery surface of the fixed container to carry out a composite treatment, and causes the powders having undergone a composite treatment to flow back in the rotating container and wherein
the secondary treating means comprises:
a plurality of compressive shear members each protruding toward the fixed container from a bottom of an outer periphery surface of the rotating container, and having an opposing surface formed in a shape along a corresponding inner periphery surface of the fixed container with a predetermined clearance from the fixed container, the plurality of compressive shear members being arranged in a circumferential direction with a predetermined interval; and
a plurality of inclined grooves each formed between adjoining compressive shear members and each inclined toward an upstream side of a rotational direction of the rotating container from a bottom side of the compressive shear member to an upper side of the compressive shear member, and
wherein the communicating hole passes all the way through the rotating container in a radial direction, is provided for each inclined groove, and is provided at a height corresponding to a bottom of the inner periphery surface of the rotating container, and
the rotating container is further provided with a bottom-part communicating hole passing all the way through a bottom of the rotating container in an axial direction, and a communicating path which communicates the bottom-part communicating hole and the compressive shear member is formed between the bottom of the rotating container and the fixed container.

2. The powder treating apparatus according to claim 1, wherein the primary treating means comprises a cylindrical member fixed and supported outside the rotating container and facing the inner periphery surface of the rotating container across an entire height direction of the inner periphery surface with a predetemained clearance from the inner periphery surface.

3. The powder treating apparatus according to claim 1, wherein the bottom-part communicating hole is provided in a bottom face of the rotating container on a circumference of a substantially-same axis as the primary treating means.

4. The powder treating apparatus according to claim 1, wherein the powders contain an active material and a conductive material both constituting an electrode material for an electrical energy accumulating device.

\* \* \* \* \*